United States Patent [19]
Berkowitz

[11] 3,784,240
[45] Jan. 8, 1974

[54] PANEL FASTENER
[75] Inventor: Irving L. Berkowitz, Binghamton, N.Y.
[73] Assignee: Kason Hardware Corporation, Binghamton, N.Y.
[22] Filed: June 23, 1972
[21] Appl. No.: 265,791

[52] U.S. Cl......... 292/111, 287/20.924, 287/20.927
[51] Int. Cl. .......................... E05c 5/00, E05c 19/12
[58] Field of Search.................. 287/20.924, 20.927; 292/111, 107, 103, 98; 52/500, 584; 74/531

[56] References Cited
UNITED STATES PATENTS
| | | | |
|---|---|---|---|
| 3,472,545 | 10/1969 | Berkowitz | 292/111 |
| 2,647,287 | 8/1953 | Jones | 287/20.924 |
| 398,549 | 2/1889 | Smith | 292/111 |
| 3,341,233 | 9/1967 | Cushman | 287/20.924 |
| 3,661,410 | 5/1972 | Larson et al. | 287/20.924 |
| 2,738,211 | 3/1956 | Schlueter | 287/20.927 |

Primary Examiner—Jordan Franklin
Assistant Examiner—Conrad L. Berman
Attorney—J. B. Felshin and Marvin Feldman

[57] ABSTRACT

This panel fastener comprises a casing having aligned bearing openings journalling oppositely extending aligned hubs of a circular cam. The hubs are eccentrically located relative to the axis of the cam. A polygonal central hole through said hubs and cam serve to receive a wrench to turn the cam. The cam has oppositely extending wings substantially diametrically opposed to said hubs. Said wings and cam have cut away means to cradle a curved friction spring clip. On the cam is a panel latch hook having a hole to rotatably receive the cam. About 270° of the hole in the hook, contacts the cam with a rotary fit. The remaining 90° of the hole is cornered with a curved corner edge of reduced radius to facilitate the unflexed spring clip to pass into the cornered portion of the hole in the hook, so that as the cam is thereafter rotated relative to the hook, the spring clip is flexed to frictionally press against the inner edge of the hole in the hook, to prevent looseness between the cam and hook.

8 Claims, 7 Drawing Figures

PATENTED JAN 8 1974 3,784,240
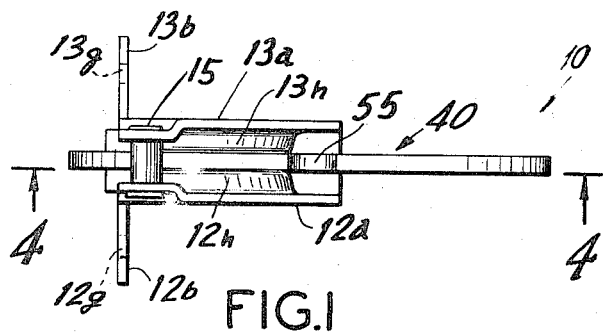
FIG.1
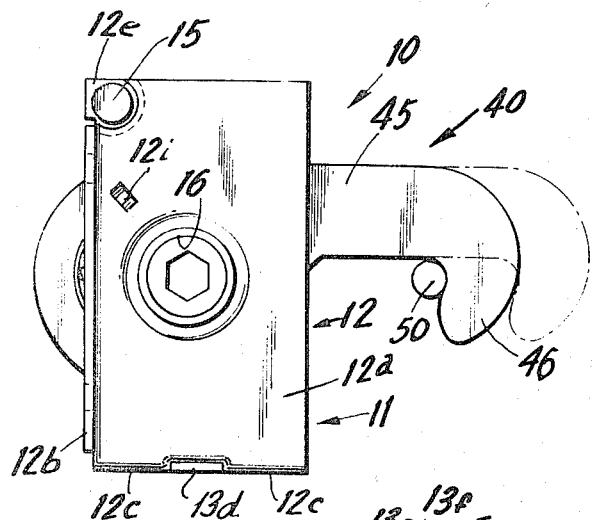
FIG.2
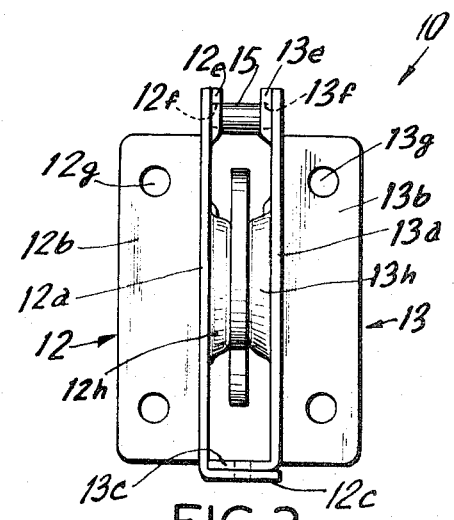
FIG.3
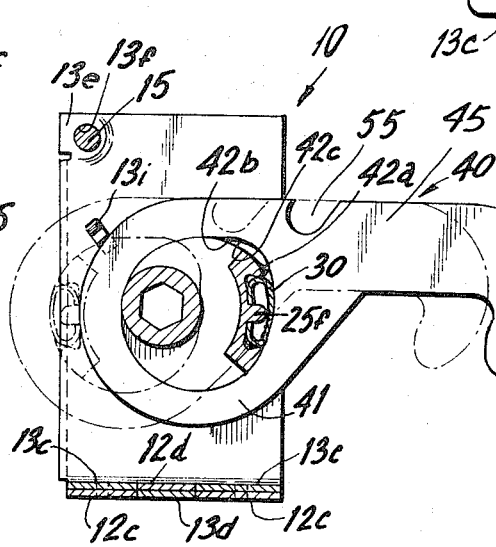
FIG.4
FIG.5
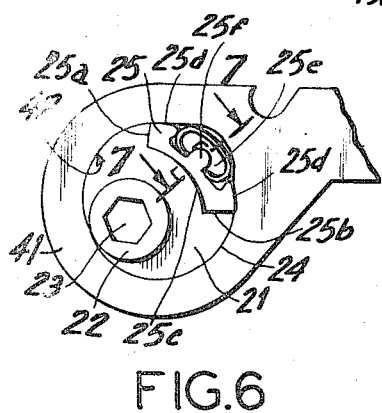
FIG.6
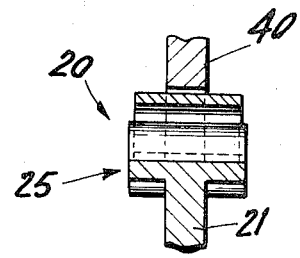
FIG.7

PANEL FASTENER

One object of this invention is to generally improve the structure disclosed in my U.S. Pat. No. 3,472,545, granted Oct. 14, 1969. Said patent disclosed a cam having a plastic friction block insert in the cam to frictionally prevent free rotation of the latching hook. It has been found that the plastic block does not create sufficient friction to prevent free rotation for a long enough period of use.

It is hence another object of this invention to provide highly improved means to prevent free rotation between the latching hook and the cam.

Still another object of this invention is to provide in a panel hook latch of the character described, spring means which is flexed when the latch hook is mounted on the cam to ensure constant and long lasting friction between the cam and latch hook.

Yet another object of this invention is to provide in a panel fastener latch assembly of the character described, means on the cam to cradle an unflexed curved spring clip, and to provide the panel hook latch with an opening so shaped as to permit the latch to be mounted on the cam in one relative angular position of the hook and cam, the construction being such as to flex or compress the spring clip when the hook is rotated away from such angular position relative to the cam, to increase the friction.

A further object of this invention is to provide a strong rugged and durable panel fastener of the character described which shall be relatively inexpensive to manufacture, easy to assemble and manipulate and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of invention will be indicated in the following claims.

Brief description of several views of the drawing;

In the accompanying drawing, in which are shown various illustrative embodiments of this invention, FIG. 1 is a top view of a panel hook fastener embodying the invention;

FIG. 2 is a side elevational view thereof;

FIG. 3 is a front edge view thereof;

FIG. 4 is a cross-sectional view taken on line 4—4 of FIG. 1;

FIG. 5 is a partial top view of the hook and cam forming part of the panel hook fastener embodying the invention, apart from the casing;

FIG. 6 is a partial side view of the hook and cam, with the cam turned 45° counterclockwise from its FIG. 4 position; and FIG. 7 is a cross-sectional view taken on line 7—7 of FIG. 6.

Referring now in detail to the drawing, 10 designates a panel hook fastener embodying the invention. Said fastener 10 comprises a casing 11. Casing 11 comprises parts 12 and 13. Part 12 has a vertical rectangular wall 12a from which a rectangular flange 12b extends at right angles thereto.

Extending from the lower end of wall 12a are coplanar spaced tabs 12c disposed at right angles to wall 12a, and a tab 12d disposed between tabs 12c but at a level just above and parallel to the level of said tabs. The upper rear corner 12e of wall 12a is offset inwardly toward member 13 to form an ear and is apertured as at 12f.

Part 13 comprises a wall 13a similar and parallel to wall 12a. Extending from wall 13a is a flange 13b symmetrical to flange 12b. Flanges 12b and 13b have openings 12g and 13g to receive fasteners (not shown) for attaching the casing to a panel.

Extending from the lower end of wall 13b are tabs 13c overlying and contacting tabs 12c, and a central tab 13d underlying and contacting tab 12d. Each pair of tabs 12c, 13c are attached together by forming a tab 13c with a hole and punching a lug or lance from tab 12c up into such hole. The upper rear corner 13e of wall 13a is offset inwardly toward offset 12e. Said offset ear 13e also has an aperture 13f aligned with aperture 12f of offset ear 12e. A rivet 15 serves to interconnect said offsets ears 12e, 13e.

Tabs 12c, 13c and 12d, 13d may also be attached together by welding, if desired.

Walls 12a, 13a are formed with aligned, inwardly pressed bearing bosses 12h, 13h forming bearing openings 16 for the purpose hereinafter appearing.

Disposed between casing walls 12a, 13a is a cam 20 comprising a central wall 21 from which there projects sideways, a pair of oppositely extending, aligned hubs 22. Said hubs and cam are formed with a through hole 23 of polygonal shape to receive a wrench for turning the cam. The axis of hubs 22 is offset from the axis of the cam. Said cam has a part circular rim edge 24. Said cam has wings 25 extending to opposite sides thereof. The hubs 22 extend outwardly further than the wings 25. The wings are disposed between walls 12a, 13a whereas the hubs 22 project into openings 16 of said walls 12a, 13a. Said wings have end edges 25a, 25b. The angular extent of said wings is somewhat greater than 90°. The edge 25b is thicker than edge 25a. The wings are curved at their inner sides, as at 25c. At the ends of wings 25 are part cylindrical surfaces 25d forming extensions of the cylindrical or circular surface 24. Between the surfaces 25d is a recess 25e into which projects radially outwardly, a central lug or barrier 25f. In the recess is mounted a C-shaped spring clip 30 of hardened spring steel. The inwardly curved ends 30a of spring clip 30 projects down into recess 25e and their end edges contact opposite sides of the lug or barrier 25f. In the unflexed condition of spring clip 30, its central portion projects radially outwardly beyond the cylindrical imaginary surface of the cam between the surfaces 25d. The purpose of such construction is to enable application of the spring clip to the cam in the unflexed state of the clip.

Mounted on the cam is a panel latch hook member 40. Said member 40 comprises a rear portion 41 formed with an opening 42 to receive the cam 20. To this end said opening 42 is circular for about 270° of its angular extent. The radius of this part-circular portion of the opening is such that the cam can turn or rotate relative to the member 40. Said member 40 has an arm 45 extending from portion 41 and formed with a hook 46 at its outer end.

A radial line through the axis of cam 20 and through the middle of barrier 25f is +5°, −0° to a line passing through the axis of the cam and through the center of hubs 22.

The arm 45 is above these lines in the position shown in FIG. 4.

Said opening 42 is squared off in the 90° portion of the openings 42 between the 270° circular portion thereof, forming a notch having substantially vertical edge 42a connected to a substantially horizontal edge 42b connected by a circular portion 42c of smaller radius than the radius of the 270° circular portion of said opening. Edge portions 42a, 42b are tangent to the part circular edge of said opening 42. The notch in opening 42 as well as the recess 25e are of uniform cross-section throughout. When said recess and notch are aligned the C-spring can be dropped into the aligned notch and recess. The C-spring being made of strip material has surface contact with the inner edge of the hook member. It will now be seen that when the cam is moved through an angle of 45° in a counter clockwise direction from the position of FIG. 4 to the postion of FIG. 6, the cam and its clip spring 30 can easily be assembled or disassembled with respect to the hook member 40 (when the hook member and cam are not in the casing). After the hook member is assembled with the cam, the cam may be turned 45°, + 5°, 0° in a clockwise direction to index the cam and to fully flex the spring clip and to impose friction between the clip and the surface 42a of the opening 42. The hook is engaged with a pin 50 of a panel pin fastener (not shown) and further rotation of the cam in a clockwise direction for 180° will pull the hook member 40 to the left, looking at FIG. 4, from the full line position to the dot-dash line position. The panel pin fastener (not shown) has a pin 50 engaged by the hook 46 to pull the pin on the panel pin fastener to the left as the hook member 40 moves to the left.

The walls 12a, 13a are also formed with inwardly punched stops 12i, 13i to stop rotation of the cam 20 substantially in the dot-dash line position of FIG. 4.

At the upper edge of arm 45 there is a notch 55 to engage rivet 15 upon manually rotating the member 45 upwardly (in a counter-clockwise direction) so as to be more fully enclosed between walls 12a, 13a, during shipment. A slight turn of the cam in a counter clockwise direction will bring the member 45 up, after member 40 has been rotated substantially 90° in a counter clockwise direction, so that the bottom of the notch 55 contacts the rivet 15 to hold said member against rotating back to its horizontal position.

It will thus be seen that there is provided an article in which the several objects of this invention are achieved, and which is well adapted to meet the conditions of practical use.

As possible embodiments might be made of the above invention, and as various changes might be made in the embodiments above set forth, it is to be understood that all matter herein set forth or shown in the accompanying drawing, is to be interpreted as illustrative and not in a limiting sense.

I claim:

1. A panel hook fastener assembly comprising a casing, a cam having a part circular outer edge, means to mount said cam on said casing about an axis offset from the axis of said edge, a panel hook fastener member having an opening rotatably receiving said cam, spring friction means interposed between said cam and the inner edge of the opening in said member, and wrench engaging means on said cam for rotating the cam, said cam having an outwardly opening recess, said spring means being cradled in said recess, said cam having a lug projecting radially outwardly into said recess, said spring means comprising a C-shaped spring clip straddling said lug with end edges of the clip extending inwardly toward each other and disposed on opposite sides of said lug, said opening in said hook fastener member having a radially outwardly extending notch, a portion of said spring clip projecting into said notch when said recess and notch are aligned to frictionally maintain the cam and panel hook fastener together upon thereafter rotating said cam relative to said fastener member.

2. The combination of claim 1, a portion of said spring between said end edges, in the unflexed condition of said spring, projecting radially beyond said recess in said cam.

3. The combination of claim 2, said opening in said panel hook fastener member having a part circular inner edge rotatably engaging the part circular part of the cam, and said notch forming edge portions tangent to said part circular inner edge and out of contact with said cam, to facilitate insertion of the spring in unflexed condition into said recess and notch when said recess and notch are aligned, to permit flexing of said spring, upon thereafter rotating said cam relative to said panel book fastener member, as said spring is moved into engagement with the part circular inner edge of the opening in said panel hook fastener member.

4. The combination of claim 3, said part circular edge portion of said opening in said member being substantially 270° in angular extent, the remaining substantially 90° angular extent of said edge of said opening comprising said notch, said notch being squared off and formed with a corner curve of smaller radius than the radius of said 270° portion of said inner edge of said opening in said member.

5. The combination of claim 1, said C-shaped spring means comprising a metal spring clip.

6. The combination of claim 5, and means on said cam to rotate said C-shaped spring clip therewith.

7. The combination of claim 6, said spring clip, in normal unflexed condition, extending radially beyond the circular edge of said cam.

8. The combination of claim 7 said opening in said panel hook member being outwardly extending, permitting the portion of the C-shaped spring which extends radially beyond said cam to be received in said notch of the opening in said member and in said recess when said notch and recess are aligned to facilitate assembly of said cam and member and spring.

* * * * *